May 16, 1967 C. L. LOVERCHECK 3,319,607
ANIMAL FEEDER
Filed Oct. 22, 1965

INVENTOR.
CHARLES L. LOVERCHECK

United States Patent Office 3,319,607
Patented May 16, 1967

3,319,607
ANIMAL FEEDER
Charles L. Lovercheck, 632 W. 7th St., Erie, Pa. 16502
Filed Oct. 22, 1965, Ser. No. 501,298
1 Claim. (Cl. 119—52)

This invention relates to conveyors and, more particularly, to conveyors in combination with troughs for feeding cattle and other livestock.

Automatic cattle feeders, according to previous inventions, have incorporated relatively expensive, complex structures.

The invention disclosed herein utilizes a conventional feed yard trough which has a flat bottom and spaced sides and a conveyor having flights which are less in length than the width of the bottom of the trough so that feed is automatically distributed along the trough at the sides of the flights of the conveyor and carried by the conveyor flights along the trough.

It is, accordingly, an object of the present invention to provide an improved automatic feeder.

Another object of the invention is to provide a feeder utilizing a trough and a chain conveyor with spaced flights thereon to distribute the feed.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
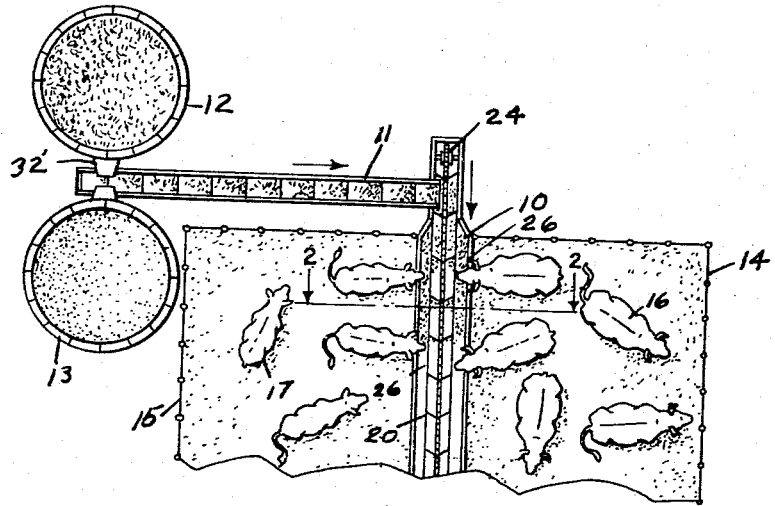
FIG. 1 is a top view of a part of a feeder according to the invention.
Figure 2:
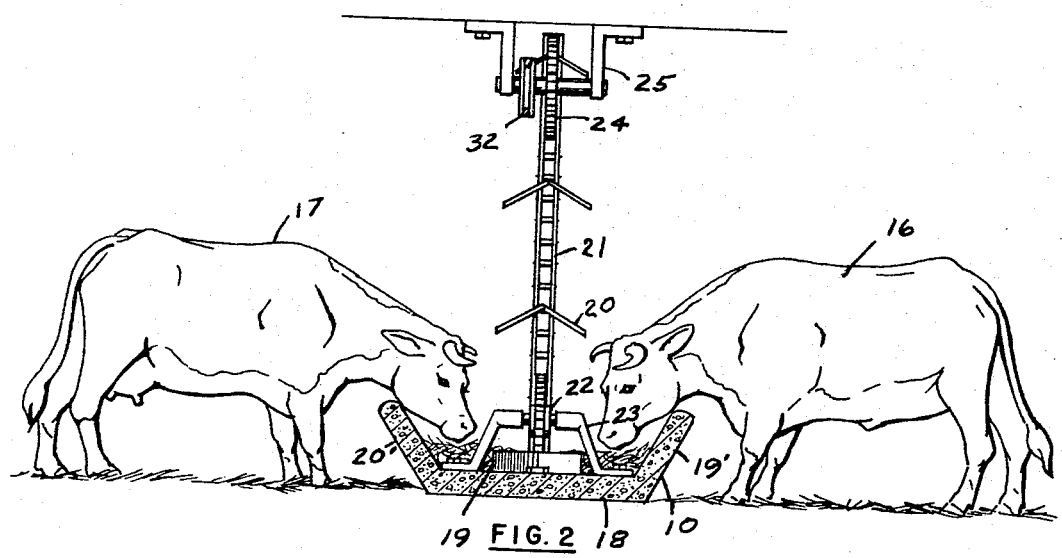
FIG. 2 is a cross sectional view taken on line 2—2 of FIG. 1.
Figure 3:
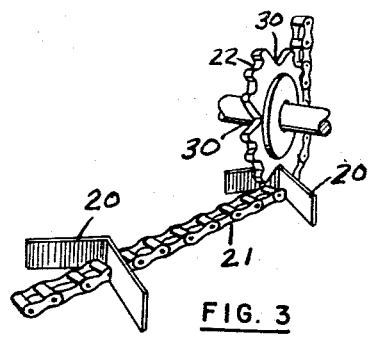
FIG. 3 is an enlarged view of the chain and sprocket arrangement.

Now with more particular reference to the drawing, a trough 10 is shown having a lateral supply trough 11 supported adjacent silos 12 and 13. The trough 10 extends between two feed lots 14 and 15 which may contain cattle 16 and 17. The trough 10 has sides 19' and 20' and a bottom 18 which has a surface 19 on which flights 20 run.

The flights 20 are attached in spaced positions to a chain 21 which may be considered to be a belt. The chain 21 runs over the first sprockets 22 which are supported to the trough 10 on brackets 23, and around second sprockets 24 which are supported above the trough 10 on brackets 25. It will be noted that when the flights move along the bottom of the trough, the feed slides outwardly and forms a row of feed 26 along each side of the flights 20 so that the feed forms a natural barrier to convey the feed which is between the flights from one end of the trough to the other, and it is automatically distributed therebetween.

It will be noted that the sprockets 22 and 24 have spaced notches 30 therein. These spaced notches are disposed along the circumference of the sprockets 22 and 24 an amount equal to the spacing to multiples of lengths between the flights 20 so that each time a flight 20 comes into engagement with a sprocket 22, it will move into the notches 30.

A suitable drive arrangement 32 is provided to drive the chain 21 and a similar drive will be provided to drive a lateral supply through 32' carrying the feed from the silo.

The foregoing specification sets forth the invention in its preferred practical forms but the structure shown is capable of modifications within a range of equivalents without departing from the invention which is to be understood is broadly novel as is commensurate with the appended claim.

The embodiments of the invention in which an exclusive property or privilege is claimed are defined as follows:

In combination, a feeder for livestock for feeding bulk feed and a conveyor,
   said feeder comprising an elongated trough having a substantially wide bottom and spaced sides extending upwardly therefrom,
   said conveyor comprising an elongated continuous belt, spaced, laterally extending generally V-shaped flights attached to said belt,
   a part of said flights engaging said bottom and adapted to slide in close relation thereto from approximately one end thereof to the other,
   and means to deposit feed in one end of said trough, said flights being substantially less in length than the width of said trough at said bottom whereby feed is carried along said trough by said flights and deposited in said trough along the ends of said flights, said flights being of substantial height, said flights are attached to said belt adjacent their centers and the ends of said flights incline rearwardly from the direction of travel of said belt.

References Cited by the Examiner

UNITED STATES PATENTS

| | | | |
|---|---|---|---|
| 2,652,808 | 9/1953 | Wagner | 119—52 |
| 2,754,801 | 7/1956 | Reese | 119—52 |
| 2,984,338 | 5/1961 | Pochman et al. | 198—224 |

SAMUEL KOREN, *Primary Examiner.*

HUGH R. CHAMBLEE, *Examiner.*